Nov. 4, 1941.  L. BIRKIGT  2,261,104
MEANS FOR DRIVING TWO COAXIAL SHAFTS IN OPPOSITE DIRECTIONS
Filed Oct. 18, 1939
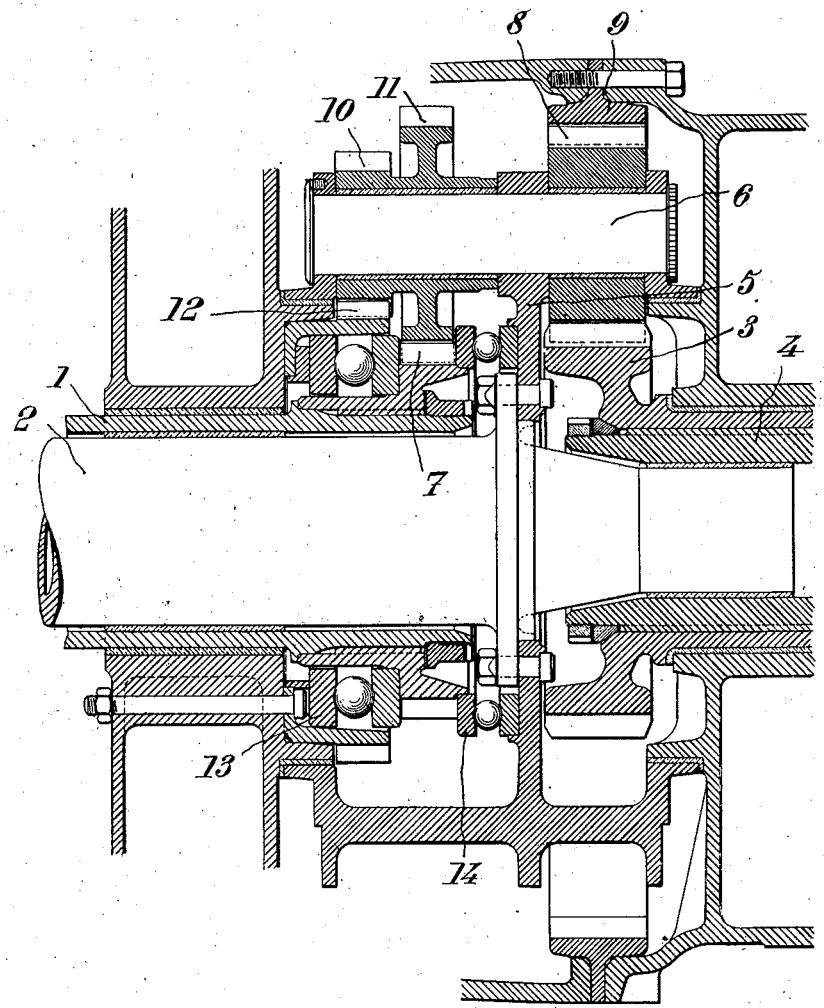
INVENTOR
LOUIS BIRKIGT,
BY
ATTORNEYS Patented Nov. 4, 1941

2,261,104

UNITED STATES PATENT OFFICE 2,261,104

MEANS FOR DRIVING TWO COAXIAL SHAFTS IN OPPOSITE DIRECTIONS

Louis Birkigt, Versoix, near Geneva, Switzerland

Application October 18, 1939, Serial No. 300,095
In Belgium June 30, 1939

5 Claims. (Cl. 74—305)

This invention relates to means for driving two coaxial shafts in opposite directions, of the kind comprising an epicyclic system the cage of which is connected to one of the shafts to be driven whilst the other driven shaft is controlled by a satellite of the system, the drive being communicated from a sun-wheel gearing with a satellite element which runs on a fixed set of teeth; and it concerns more particularly, but not exclusively, reduction gears for aircraft which comprise two coaxial propellers to turn in opposite directions.

It has already been proposed, in the specification of British Patent No. 131,674, to constitute such means by an epicyclic system comprising satellite elements each comprised by three pinions integral in rotation and gearing, one pinion with the driving sun-wheel, another pinion with a fixed set of teeth and the last pinion with another sun-wheel integral in rotation with one of the shafts to be driven, the other driven shaft being connected to the satellite cage of the epicyclic system.

The invention has for its main object so to make the aforesaid means that they respond, better than hitherto, to the various desiderata of practice and, especially, that their bulk is reduced.

In general, in accordance with the principal feature of the invention the means for driving the two coaxial propeller shafts in opposite directions, having an epicyclic system driven from a driving sun-wheel, comprises at least two independent satellite elements mounted loosely, preferably on the same axle and of which one is driven by the driving sun-wheel and runs on a fixed set of teeth, whilst the other runs on a second fixed set of teeth and gears with a driven sun-wheel connected to one of the shafts to be driven, the other driven shaft being coupled to the satellite cage.

In order that the invention may be better understood, it will now be described with reference to the accompanying drawing, the single figure of which shows in axial section (by way of example) a reduction gear for aircraft, the said gear being constructed according to the invention.

According to the drawing, for driving the two coaxial shafts 1 and 2 (in opposite directions) each carrying a propeller, the following or a similar procedure is adopted.

This reduction gear comprises an epicyclic system driven by a sun-wheel 3 carried by a driving shaft 4, the satellite cage 5 of the said system being connected to one of the propeller-carrying shafts, for example to the inner shaft 2.

According to the principal feature of the invention, this epicyclic system comprises at least two independent satellite elements mounted loosely preferably on the same axle 6 and one of which is driven by the driving sun wheel 3 and runs on a fixed set of teeth whilst the other runs on a second fixed set of teeth and gears with a driven sun-wheel 7 connected to the propeller-carrying shaft 1.

It will readily be understood that such a reduction gear constructionally will present a degree of freedom greater than that forming the subject of the British patent aforesaid, by reason of the fact that the satellite elements gearing respectively with the driving sun-wheel and the driven sun-wheel are independent the one of the other, whereas in the said British patent they must of necessity by their construction have the same angular speed of rotation around their common axle.

In other words, it will be possible, with a reduction gear according to the invention, given the facts of the problem concerned (speed of the driving shaft and speeds of the driven shafts), to take advantage of certain characteristics of the epicyclic system so as to reduce to the minimum the bulk of the mechanism, the determination of the aforesaid characteristics then being able to take place with a parameter having greater variation than in the case of the reduction gear described in the specification of the aforesaid British patent.

Moreover, from the fact that there are provided two fixed sets of teeth on which the two independent satellite elements run, it will be possible to distribute the reaction stresses to which the driving of the two propeller-carrying shafts gives rise on the two fixed sets of teeth with which coact the two aforesaid satellite elements, each of these sets of teeth consequently being able to have a width less than in the case where all the reaction is taken by a single set of teeth as provided in the specification of the British patent above mentioned.

The two independent satellite elements may be constituted and arranged, for example, so that the one which must be driven by the driving sun-wheel 3, viz. a pinion 8, is interposed between the said sun-wheel and an internally toothed annulus 9. The other, that is the one which must gear with the driven sun-wheel 7, comprises two pinions 10 and 11 integral in rotation the one with the other, one of which coacts with the driven sun-wheel whilst the other runs on the periphery of an externally toothed fixed ring 12.

The characteristics of the various pinions are determined so as to obtain the desired reduction (for example a reduction from 1 to 2 assuming the shafts 1 and 2 must have the same absolute speed of rotation).

Such a reduction gear will finally with advantage be completed by providing thrust bearings 13 and 14 to transmit the axial reactions exerted on the members connected respectively to the propeller-carrying shafts 1 and 2.

The operation of such a reduction gear for aircraft, which must be apparent from the foregoing description, is obvious and it appears unnecessary to enter into any complementary explanation in this connection.

Further, such a reduction gear has, in addition to the advantages above indicated, that of comprising satellite-carrying axles integral with the satellite cage, whereas in the aforesaid British specification these axles were rotary, and that of having, as shown by calculation, a speed of rotation of the satellites less than that taking place, other things being equal, in the reduction gear forming the subject of the aforesaid British specification.

The invention is not limited to the precise forms or details of construction described, as these may be varied to suit particular cases.

Having now particularly described and ascertained the nature of my said invention and in what manner the same is to be performed, I declare that what I claim is:

1. An epicyclic reduction gear connecting a driving shaft and two driven shafts, comprising a cage carried by one of said shafts, a plurality of coaxial pairs of satellite pinion means carried by said cage, each member of the pairs of pinion means being rotatable independently of the other member whereby to provide first and second independent pinion means systems, a sun wheel on one of the other of said shafts meshing with the first pinion means system, a second sun wheel on the other of said other shafts meshing with the second pinion means system, and fixed means having teeth geared with each of said pinion means systems.

2. An epicyclic reduction gear connecting a driving shaft and two driven shafts, one of said shafts being rotatably mounted inside at least one of the other of said shafts, comprising a cage mounted on the inner shaft, a plurality of coaxial pairs of satellite pinion means carried by said cage, each member of the pairs of said pinion means being rotatable independently of the other member whereby to provide first and second independent pinion means systems, a sun wheel on one of the other of said shafts meshing with the first pinion means system, and a second sun wheel on the other of said other shafts meshing with the second pinion means system, and means having fixed teeth geared to each of said pinion means systems.

3. An epicyclic reduction gear for driving two coaxial driven shafts by a driving shaft, comprising a cage carried by one of said shafts, a plurality of coaxial pairs of satellite pinion means carried by said cage, each member of the pairs of pinion means being rotatable independently of the other whereby to provide first and second independent pinion means systems, a sun wheel on one of the other of said shafts meshing with the first pinion means system, a second sun wheel on the other of said other shafts meshing with the second pinion means system, and means forming a fixed internal gear geared to one of said pinion means systems and forming a fixed external gear geared to the other of said pinion means systems.

4. An epicyclic reduction gear connecting a driving shaft and two driven shafts, comprising a cage carried by one of said shafts, a plurality of pairs of satellite pinions carried by said cage, each member of the pairs of pinions being rotatable independently of the other member whereby to provide first and second pinion systems, the pinions forming one of said systems having two sets of teeth of different diameters, a sun wheel on one of said other shafts meshing with one of said sets of teeth, a sun wheel on the other of said shafts meshing with the other of said pinion systems, fixed means having teeth geared to said other system and teeth geared to said other set.

5. An epicyclic gear for driving two coaxial driven shafts in opposite directions by a driving shaft, comprising a cage carried by the inner driven shaft, a pair of axially spaced satellite pinion means carried by said cage, each of said pinion means being rotatable independently of the other, a sun wheel on said driving shaft meshing with the first of said pinion means, fixed means having teeth comprising a fixed internal gear meshing with said first pinion means, a sun wheel on the outer driven shaft meshing with the second of said pinion means, said fixed means having a second set of teeth comprising an external gear meshing with said second pinion means.

LOUIS BIRKIGT.